Figure 1:
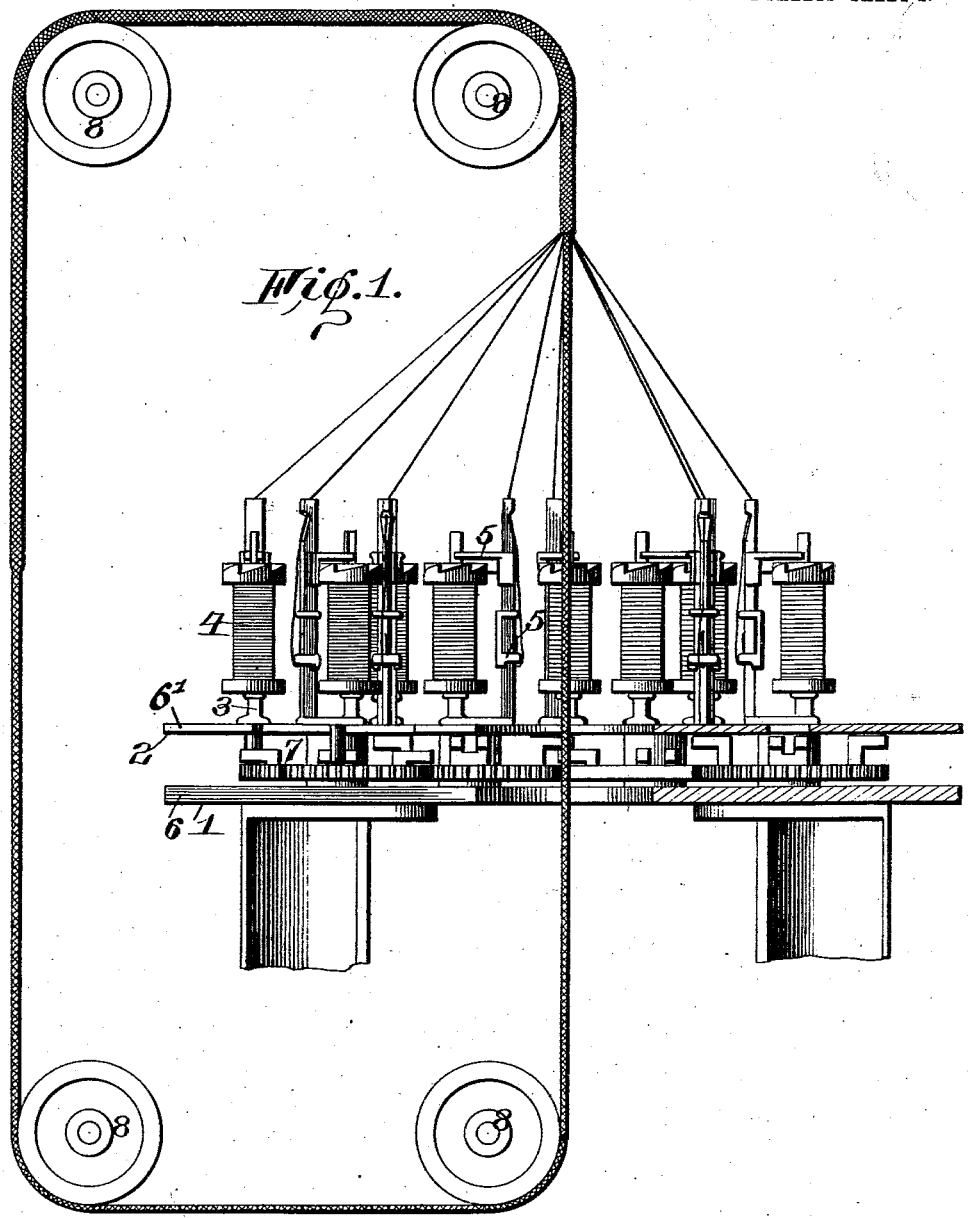

No. 758,286. PATENTED APR. 26, 1904.
L. P. WARNER.
BELTING AND METHOD OF MAKING SAME.
APPLICATION FILED MAY 13, 1902.
NO MODEL. 2 SHEETS—SHEET 1.

Witnesses
Walter B. Payne.
G. Willard Rich.

Inventor.
Louis P. Warner
by Hudson & Church
his Attorney

No. 758,286. PATENTED APR. 26, 1904.
L. P. WARNER.
BELTING AND METHOD OF MAKING SAME.
APPLICATION FILED MAY 13, 1902.
NO MODEL. 2 SHEETS—SHEET 2.
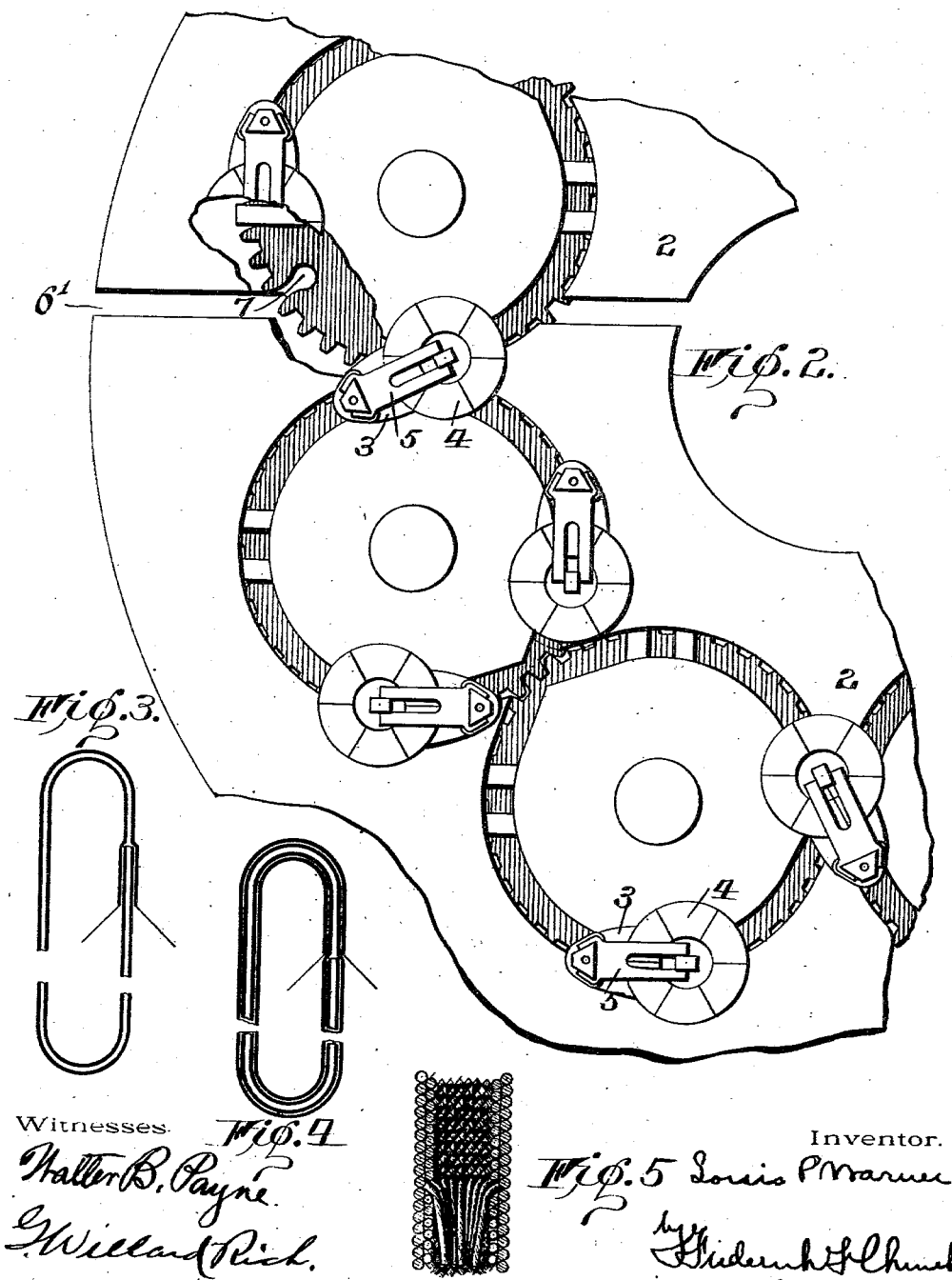
Witnesses.
Walter B. Payne.
G. Willard Rich.
Inventor.
Louis P. Warner
by Frederick F. Church
his Attorney
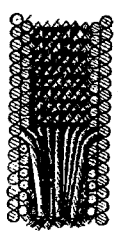

No. 758,286.

Patented April 26, 1904.

UNITED STATES PATENT OFFICE.

LOUIS P. WARNER, OF ROCHESTER, NEW YORK.

BELTING AND METHOD OF MAKING SAME.

SPECIFICATION forming part of Letters Patent No. 758,286, dated April 26, 1904.

Application filed May 13, 1902. Serial No. 107,115. (No model.)

*To all whom it may concern:*

Be it known that I, LOUIS P. WARNER, of Rochester, in the county of Monroe and State of New York, have invented certain new and useful Improvements in Belting and Methods of Making the Same; and I do hereby declare the following to be a full, clear, and exact description of the same, reference being had to the accompanying drawings, forming a part of this specification, and to the reference-numerals marked thereon.

My present invention has for its object to provide an improved continuous or endless belt adapted particularly for operating light machinery, such as dental hand-tools, and to an improved method of making the same.

Heretofore belts of the class to which mine belongs have been made of a series of pieces of material fastened end to end or by joining the ends of a single strip, cable, braid, or cord by sewing such ends together or employing special fasteners for the purpose; but such articles have not been entirely satisfactory for light machines or tools by reason of the fact that the joint or place where the ends of the belt are connected has as a rule been thicker or less flexible than the remainder, so that when the joint passing over the pulleys, and particularly the small pulleys of dental handpieces, an irregular motion is given the tool. Also such belts are found to make a perceptible noise in passing over the pulleys, which is objectionable.

My improved belt consists generally of a continuous piece of material or fabric composed of two or more thicknesses, one contained within another, the free ends of the strands or threads composing the braid being secured in any suitable manner, as by sewing or interweaving them by hand, for the purpose merely of preventing unraveling.

The method of making the belt consists in braiding or interlacing a series of strands by means of a braiding-machine or otherwise forming a braid or core of the proper length for the belt desired and then interlacing or braiding over this core a tubular covering composed of the same strands which formed the core, thereby forming a continuous belt of two or more thicknesses, and finally securing the free ends of the braided covering within the belt, as will be hereinafter more fully described.

In the accompanying drawings, Figure 1 represents a sectional view of a braiding-machine of any approved form, showing the method of making the belt. Fig. 2 is a detailed plan view of a portion of the framework and thread-carriers. Fig. 3 is a diagrammatic sectional view of a belt during the process of making. Fig. 4 is a diagrammatic sectional view of the completed belt. Fig. 5 is a detailed view showing a method of securing the free ends of the braided strands or cords.

Similar reference-numerals in the several figures indicate similar parts.

In manufacturing belting according to my invention the operations are preferably carried out upon a braiding-machine of any approved construction, the only alteration or change necessary being that the bottom plates of the machine, between which the carrier-gears operate, shall be slotted to permit the passage of the belt from the interior of the machine, where it is formed, and that provision be made for permitting the belt to pass between the carrier-gears. I have not deemed it necessary in the drawings to show a complete machine, it being sufficient to illustrate merely the manner in which the completed belt may be removed.

In the drawings, 1 indicates the bottom ring plate of the machine; 2, the upper guide-plate for the carriers; 3, the carriers; 4, the thread or cord bobbins or spools, and 5 the tension weights and stops. At one side of the machine the bottom plate 1 is provided with a slot 6, a similar slot 6' being also formed in the top of guide-plate 2, as shown in Fig. 2, leading from the interior to the exterior, and one of gears located at the side of said slot is provided with a recess 7, into which the completed belt may pass to carry the inner portion thereof to the exterior of the machine through the slots 6 and 6' when placed in the recess 7 and the gear is rotated in one direction.

8 indicates pulleys or guides located, preferably, above and below the bottom plate of the machine, around which the belt is adapted to extend while being formed.

In making the belt it is only necessary to make in the usual manner a braid, cord, or tape, preferably tubular, of the length desired for the belt, this braid extending upward from the machine and around the pulleys until the proper or desired length has been formed, and the end of the braid is then introduced between the strands of thread or cord from the carriers, the machine being stopped momentarily for this purpose. As soon as the end is secured by braiding the strands over it the braiding operation is continued until the first end and where the cord is of double thickness reaches the point where the braiding operation is performed, as shown, for instance, in Fig. 4. Then the strands are cut, and the continuous belt is removed through the slots 6 and 6' in the bottom and top plates, the central portion of the belt being inserted in the aperture 7 of the carrier-gear, which is rotated for this purpose, as will be readily understood. If it should be desired to form a belt of several superimposed thicknesses, the braiding operation may be continued as long as desired, being arrested at the starting-point, so that there will be an even number of thicknesses throughout the belt. The ends of the strands, being severed, may be secured by hand by being threaded upon a needle and passed to the interior of the belt, as shown in Fig. 5, or otherwise, no particular care being required in firmly securing these ends excepting to prevent any raveling. The belt thus formed composed of several superposed thicknesses is particularly strong, and the friction or gripping action which the external envelop exercises upon the internal one effectually prevents stretching or separation, and for this reason no strain is brought to bear upon the ends of the strands, which are simply passed into the belt or otherwise secured to prevent unraveling.

It is found in practice that the belts constructed according to my invention are materially more desirable for use in connection with dental motors for the reason that there is no joint which is at all noticeable when passing over the small pulleys of the handpiece or motors and the cost of production is practically nominal.

I claim as my invention—

1. An endless belt having an inner convolution entirely inclosed within an outer convolution, both the inner and outer convolutions formed by a continuous fabric.

2. An endless belt having an inner convolution entirely inclosed within an outer convolution or covering, both of said convolutions being formed in a continuous fabric with the end of its inner convolution terminating immediately adjacent the end of the outer convolution.

3. An endless belt comprising an inner convolution, and an outer convolution entirely inclosing the former and having its end located in proximity to the end of the inner convolutions, but at the outer side of an intervening layer of fabric.

4. An endless belt formed by a fabric braided in overlapping convolutions, the inner and outer ends of said convolutions terminating adjacent to each other, one at each side of an intervening layer of the fabric.

5. An endless belt formed by a fabric composed of strands braided into overlapping convolutions, the outer end thereof being terminated adjacent the end of the inner convolution, at the outer side of an intervening portion of the fabric and having the ends of its strands secured in said portion.

6. The method of making endless belts consisting of forming a braided core of the desired length, inserting one end of said core within the other and continuing the braiding over said core.

7. The method of making endless belts consisting in forming a core of a plurality of interlaced strands, inserting one end of said core between said strands and braiding them to completely inclose said core.

8. The method of making endless belts consisting in forming a tubular core of a plurality of braided strands, inserting the end of said core between said strands and braiding them over said core until the said end is reached, and finally securing the free ends of said strands.

LOUIS P. WARNER.

Witnesses:
G. WILLARD RICH,
ELIZABETH J. PERRY.